(12) United States Patent
Lang et al.

(10) Patent No.: US 7,431,906 B2
(45) Date of Patent: Oct. 7, 2008

(54) SELECTIVE CATALYTIC REDUCTION

(75) Inventors: Jürgen Lang, Kirchheim-Teck (DE);
Rüdiger Schütte, Alzenau (DE);
Markus Rudek, Bruchköbel (DE)

(73) Assignee: Degussa AG, Essen (DE)

( * ) Notice: Subject to any disclaimer, the term of this patent is extended or adjusted under 35 U.S.C. 154(b) by 780 days.

(21) Appl. No.: 10/478,031

(22) PCT Filed: Mar. 21, 2002

(86) PCT No.: PCT/EP02/03163

§ 371 (c)(1),
(2), (4) Date: Nov. 17, 2003

(87) PCT Pub. No.: WO02/094419

PCT Pub. Date: Nov. 28, 2002

(65) Prior Publication Data

US 2004/0146441 A1    Jul. 29, 2004

(30) Foreign Application Priority Data

May 19, 2001 (DE) ................................ 101 24 549

(51) Int. Cl.
*B01D 53/56* (2006.01)
(52) U.S. Cl. ..................................... 423/235
(58) Field of Classification Search .................. 423/235
See application file for complete search history.

(56) References Cited

U.S. PATENT DOCUMENTS 6,176,078 B1    1/2001    Balko et al.

FOREIGN PATENT DOCUMENTS

| DE | 198 20 828 A1 | 11/1999 |
|---|---|---|
| DE | 199 03 533 A1 | 8/2000 |
| EP | 0 367 025 A1 | 5/1990 |
| EP | 0 385 164 A2 | 9/1990 |
| EP | 0 773 354 A1 | 5/1997 |
| EP | 0 861 972 A1 | 9/1998 |
| EP | 1 023 935 A1 | 8/2000 |
| EP | 1 149 622 A1 | 10/2001 |
| JP | 04 022419 | 1/1992 |
| JP | 04 310212 | 11/1992 |
| JP | 10-002219 | 1/1998 |
| JP | 11-030117 | 2/1999 |
| JP | 11 253745 | 9/1999 |
| JP | 10-23935 | 8/2000 |
| WO | WO 99/49958 A | 10/1999 |

*Primary Examiner*—Edward M. Johnson
(74) *Attorney, Agent, or Firm*—Robert G. Weilacher; Smith, Gambrell & Russell

(57) ABSTRACT

A process for the selective catalytic reduction of nitrogen oxides with ammonia in a lean-mix exhaust gas from a combustion process operated with a first, lean-mix air/fuel mixture, wherein the ammonia required for selective reduction is obtained from a second, rich-mix air/fuel mixture which contains nitrogen monoxide by reduction of the nitrogen monoxide in a $NH_3$ synthesis step to give ammonia with the formation of a product gas stream, and where the nitrogen monoxide-containing second air/fuel mixture is supplied to the $NH_3$ synthesis step for reduction of the nitrogen monoxide to ammonia over a three-way converter catalyst and the ammonia formed is separated from the product gas stream and is stored in a storage medium for use as and when required for selective catalytic reduction.

18 Claims, 2 Drawing Sheets

SELECTIVE CATALYTIC REDUCTION

BACKGROUND OF THE INVENTION

The invention provides a process for the selective catalytic reduction of nitrogen oxides with ammonia in the lean-mix exhaust gas from a combustion process.

Nitrogen oxides which are produced in combustion processes are included among the main causes of acid rain and of the environmental damage associated therewith. Sources of release of nitrogen oxides into the environment are mainly the exhaust gases from motor vehicles and also the vent gases from combustion plants, in particular from oil-, gas- or coal-fired power stations or from stationary internal combustion engines and from industrial operations.

One feature of the exhaust gases from these processes is their high oxygen content which makes it difficult to reduce the nitrogen oxides present therein. The air ratio lambda ($\lambda$) is frequently used to characterise the oxygen content. This is the air/fuel ratio, normalised to stoichiometric ratios, of the air/fuel mixture with which the combustion process is operated. In the case of stoichiometric combustion, the air ratio is one. In the case of superstoichiometric combustion, the air ratio is greater than 1; the resulting exhaust gas has a lean-mix composition. In the opposite case, a rich-mix exhaust gas is referred to.

A process which has been used for some time to remove nitrogen oxides from such exhaust gases is so-called 'selective catalytic reduction' (SCR) with ammonia on a specially designed reduction catalyst. Suitable catalysts for this are described, for example, in the patents EP 0 367 025 B1 and EP 0 385 164 B1. They consist of a mixture of titanium oxide with oxides of tungsten, silicon, vanadium and others. Catalysts based on zeolites exchanged with copper and iron have also been disclosed. These catalysts display their optimum activity at temperatures between 300 and 500° C. and with a molar ratio between the reducing agent ammonia and the nitrogen oxides of 0.6 to 1.6. Depending on how the combustion process is managed, 60 to 90 vol. % of the nitrogen oxides present in the exhaust gases consists of nitrogen monoxide upstream of the catalyst.

To perform this process in motor vehicles, the ammonia required for selective catalytic reduction has to be supplied on-board the vehicle. As an alternative to environmentally harmful ammonia, a compound which reacts to give ammonia, such as for example urea, may also be used. The advantage of this process is based on the fact that operation of the engine can be optimised independently of exhaust gas treatment. However, the large-scale use of this process requires the construction of a costly urea infrastructure.

In order to avoid the construction of a urea supply, EP 0 773 354 A1 proposes producing the ammonia required for selective catalytic reduction on-board the vehicle, from the fuel which is also being supplied. For this purpose, the internal combustion engine is operated alternately with a lean-mix and a rich-mix air/fuel mixture. The exhaust gas formed in this way is passed over a three-way converter catalyst and a catalyst for selective catalytic reduction. During operation with the rich-mix air/fuel mixture, the nitrogen oxides present in the exhaust gas are reduced to ammonia on the three-way converter catalyst under the reducing conditions of the rich-mix exhaust gas. The ammonia being formed is stored by the SCR catalyst. During operation with lean-mix exhaust gas, the nitrogen oxides present in the exhaust gas pass through the three-way converter catalyst and are reduced to nitrogen and water on the SCR catalyst, with consumption of the previously stored ammonia.

DE 198 20 828 A1 describes a process in which the internal combustion engine is also operated alternately with a lean-mix and rich-mix air/fuel mixture. The exhaust gas treatment system contains three catalysts, wherein a nitrogen oxide storage catalyst is located in the exhaust gas section of the engine, upstream of the three-way converter catalyst in the process described above. During operation of the engine with a lean-mix air/fuel mixture, a considerable proportion of the nitrogen oxides present in the exhaust gas is stored on the storage catalyst, whereas the remaining proportion of the nitrogen oxides is reacted on the SCR catalyst, with consumption of the previously stored ammonia. During operation of the engine with a rich-mix air/fuel mixture, the nitrogen oxides stored on the storage catalyst are released and react on the downstream three-way converter catalyst to give ammonia, which is then stored on the SCR catalyst.

EP 0 861 972 A1 describes a variant of this process, wherein the ammonia required is also synthesised on-board the motor vehicle, with the aid of a three-way converter catalyst, from the nitrogen, oxides present in a rich-mix exhaust gas. To produce the rich-mix exhaust gas stream, some of the cylinders in the internal combustion engine are operated with a rich-mix air/fuel mixture and the, exhaust gas from these is passed over the three-way converter catalyst separately from the lean-mix exhaust gas from the remaining cylinders in order to synthesise ammonia.

One essential disadvantage of the last three processes is based on the intervention in engine management which is required and on the high light-off temperature of the catalysts. As a result of the requirement to alter the exhaust gas composition between rich-mix and lean-mix in a cyclic manner, in order to form ammonia, the optimisation potentials with regard to engine efficiency cannot be achieved. In addition, using this process it is possible to match the amount of ammonia produced to the actual amount required only with great difficulty. This applies in particular when the load conditions in the engine are changing rapidly.

DE 199 03 533 A1 describes another process for the selective catalytic reduction of nitrogen oxides in oxygen-containing exhaust gases. In this case, in addition to the lean-mix exhaust gas from the engine, a rich-mix gas stream is produced, independently of how the engine is operated, and this is treated in an electrical gas discharge plasma in order to form the ammonia required for the reduction process. This rich-mix exhaust gas stream can be produced, for example, by a separate burner which is operated with a substoichiometric air/fuel mixture and provides a nitrogen oxide-containing exhaust gas. The plasma catalytic ammonia synthesis proposed here is more effective, from an energy and equipment point of view, than the solution in accordance with the three processes mentioned above.

Although the process in DE 199 03 533 A1 dissociates the synthesis of ammonia from the exhaust gas in the internal combustion engine, this process also presents enormous problems in rapidly matching the production of ammonia to the amount required, for example when the load conditions are altering.

SUMMARY OF THE INVENTION

The object of the present invention is to provide an alternative process for the removal of nitrogen oxides from the exhaust gases of combustion processes which produces the ammonia required for selective catalytic reduction independently of the combustion process and enables addition of the ammonia to be matched to the possibly rapidly changing conditions of the combustion process.

This object is achieved by a process for the selective catalytic reduction of nitrogen oxides with ammonia in the lean-mix exhaust gas from a combustion process/heat engine operated with a first lean-mix air/fuel mixture, wherein the ammonia required for the selective reduction is obtained from a second rich-mix air/fuel mixture which contains nitrogen monoxide, by reducing the nitrogen monoxide to ammonia in a $NH_3$ synthesis step with the formation of a product gas stream. The process is characterised in that the ammonia formed is separated from the product gas stream and is stored in a storage medium for use as and when required for selective catalytic reduction.

Whenever the term 'ammonia' is used in the following this also includes compounds which can readily be converted to ammonia, for example by the effect of heat or by hydrolysis. These include, for example, urea, ammonium carbonate, ammonium carbamate and other derivatives of ammonia.

In the present invention the formation of ammonia is isolated from the conditions in the combustion process by operating the combustion process with a first air/fuel mixture and producing the ammonia from a second air/fuel mixture which is made available independently of the first air/fuel mixture. In contrast to the procedure in DE 199 03 533 A1, to which reference is made as regards the prior art, however, the ammonia formed is not currently/immediately made available for selective catalytic reduction, but is stored temporarily in a storage medium. This enables the ammonia to be produced in a steady-state, efficiency-optimised process and enables the ammonia to be transferred from the gas phase to the liquid phase (reducing the stream of material being handled by a factor of 1000). The formation of ammonia is managed in such a way that sufficient stored ammonia is always available for all essential, in fact for all operational states which occur during the combustion process. If, due to a temporary low demand for ammonia, the storage capacity is fully used up, then the formation of ammonia can be briefly interrupted.

Thus, according to the invention, the selective catalytic reduction process uses previously stored ammonia. This enables the ammonia required to be supplied with great precision in the exhaust gas stream upstream of the SCR catalyst, even when the demand is changing rapidly.

To form ammonia in the $NH_3$ synthesis step, the second air/fuel mixture has to contain nitrogen monoxide. The nitrogen monoxide required can be obtained from air in an efficient NO synthesis step by means of a thermal plasma, for example in an electrical arc discharge or in a spark discharge. The resulting gas mixture is then enriched by supplying fuel and the molecular oxygen is converted. Alternatively, in accordance with DE 199 03 533 A1, substoichiometric combustion can be performed, that is the second air/fuel mixture is subjected to thermal combustion to form nitrogen monoxide in a NO synthesis step, this process being optimised for the formation of nitrogen monoxide.

To form the nitrogen monoxide present in the second air/fuel mixture, a rich-mix air/fuel mixture is preferably treated with an electrical gas discharge in a NO synthesis step, wherein NO formation and oxygen conversion take place quasi-simultaneously.

The gas mixture leaving the NO synthesis step, in addition to the nitrogen monoxide formed and residual fuel, also contains water vapour, nitrogen, carbon monoxide, carbon dioxide, partially oxidised hydrocarbons and optionally other reaction products. This gas mixture is now converted to ammonia in the $NH_3$ synthesis step to form ammonia. The formation of ammonia takes place according to the invention on a conventional three-way converter catalyst by reducing the nitrogen monoxide present in the second, rich-mix air/fuel mixture. This catalyst may be electrically heated in order to shorten the time it takes to reach the operating temperature.

Three-way converter catalysts are conventionally used for the treatment of exhaust gases from stoichiometrically operated petrol engines. They are able simultaneously to convert the three harmful substances present in the exhaust gas from internal combustion engines, carbon monoxide (CO), hydrocarbons (HC) and nitrogen oxides (NOx) into harmless compounds (water, carbon dioxide, nitrogen) if the exhaust gas has a substantially stoichiometric composition, that is to say its air ratio moves about within a narrow interval around the stoichiometric value of 1.0 (1.0±0.002).

The term 'three-way converter catalyst' is, in the context of this invention, a synonym for catalysts which are able to reduce the nitrogen monoxide present in rich-mix exhaust gas to ammonia. Typical three-way converter catalysts contain, as catalytically active components, platinum, rhodium and palladium, in various combinations. These noble metals are usually applied in high dispersion to active aluminium oxide as a support material. Furthermore, three-way catalysts contain so-called 'oxygen storing materials', generally cerium oxide, which can absorb and also release oxygen by changing their oxidation number. They are therefore ideally suited to compensate for small fluctuations in the air ratio around the stoichiometric value.

It has long been known (see the patent documents cited at the beginning from the prior art) that three-way converter catalysts reduce nitrogen oxides present in exhaust gases to ammonia under rich-mix exhaust gas conditions (air ratio less than 0.9). This ability of three-way converter catalysts is used in the process according to the invention to form ammonia.

The product gas stream leaving the $NH_3$ synthesis step is not, as disclosed in the prior art, used directly for the selective catalytic reduction of the nitrogen oxide currently present in the exhaust gas from the combustion engine. According to the invention, the ammonia present in the product gas stream is first separated from the product gas stream and stored in a storage medium. Separation of the ammonia from the product gas stream is preferably performed in an ammonia washer, wherein the wash liquid is simultaneously used as the storage medium for ammonia. Water is advantageously used as the wash liquid and the storage medium because it exhibits high solubility for ammonia.

The product gas stream from which ammonia has been removed can be mixed with the exhaust gas stream from the combustion process or some of it may be recycled to the entrance to the NO or $NH_3$ synthesis step. The latter variant is particularly advantageous because, in addition to ammonia, some residual unreacted nitrogen monoxide may also be present in the product gas stream, this having only a low solubility in water and therefore leaves the ammonia washer unhindered. The efficiency of ammonia formation is increased by recycling this unused nitrogen monoxide to the $NH_3$ synthesis step.

In a special embodiment of the process, the storage medium is arranged downstream of the $NH_3$ synthesis step together with the $NH_3$ synthesis step in a single reactor.

During the formation of nitrogen monoxide in the NO synthesis step from an air/fuel mixture, whether it be by substoichiometric combustion or a gas discharge, carbon monoxide, carbon dioxide and optionally other reaction products are also formed in addition to nitrogen monoxide. The presence of carbon dioxide is desirable here because it improves the efficiency of the wash process due to the formation of ammonium carbonate or ammonium hydrogen carbonate, which is also readily soluble in water.

The proposed process is suitable in principle for removing nitrogen oxides from lean-mix exhaust gases from a variety of combustion processes by selective catalytic reduction. It is particularly suitable, however, for treating the exhaust gases from internal combustion engines in motor vehicles which operate with a lean-mix air/fuel mixture, that is from diesel engines and so-called lean-mix engines. The process enables the formation of ammonia on-board the motor vehicle. The construction of an infrastructure for refuelling vehicles with ammonia solution or urea solution is not required in the case of the proposed process. Only the storage medium, that is water, has to be topped up from time to time because it, together with the dissolved ammonia and optionally other dissolved ammonium compounds, is injected directly into the exhaust gas from the internal combustion engine before contact with the SCR catalyst.

As already specified, the selective catalytic reduction procedure is supplied with the reducing agent dissolved in the storage medium by addition of the storage medium as and when required. Due to the mode of operation of the NO and $NH_3$ synthesis steps, it can be ensured that the amount of storage medium and the concentration of the ammonia dissolved therein is always sufficient for supplying the SCR process, even in the event of rapid changes in load in the internal combustion engine.

Differently from the known processes in the prior art, which also operate with the formation of ammonia on-board the vehicle, in the proposed process the ammonia is produced independently of the current requirement for exhaust gas treatment and is retained in the storage medium. This facilitates optimising the process for the formation of ammonia and thus increases the efficiency of the process.

Microreactor systems which are characterised on the one hand by a small space requirement and on the other hand by a high space-time yield can be used particularly advantageously for ammonia synthesis. All three steps in the proposed process, that is to say NO synthesis, $NH_3$ synthesis and ammonia washing, can be performed in microreactors. This principle has proven to be particularly advantageous for the NO synthesis step. To optimise the efficiency of NO formation, the nitrogen monoxide formed has to be removed as rapidly as possible from the reaction mixture. This takes place by quenching, that is to say by rapidly cooling the reaction mixture at the surfaces of the microreactor, these being very large in comparison to its volume.

BRIEF SUMMARY OF THE DRAWINGS

The process is now explained in more detail with the aid of FIGS. 1 and 2. These show.

DETAILED DESCRIPTION OF INVENTION

To form nitrogen monoxide in the NO synthesis step, gas discharge plasmas are preferably used. Different types of gas discharges can be used. High frequency discharges, also with frequencies above 250 MHz (microwave discharges), corona discharges, spark discharges, arc discharges, interrupted arc discharges and dielectrically hindered discharges, also known as barrier discharges, may be mentioned. Mixed forms of these electrical gas discharges, which may optionally be capacitively or inductively coupled, are equally suitable. Arc discharges or spark discharges are preferred; spark discharges or arc discharges in small structures with a clearance between 10 micrometres and 10 millimetres are particularly preferably used.

Figure 1:
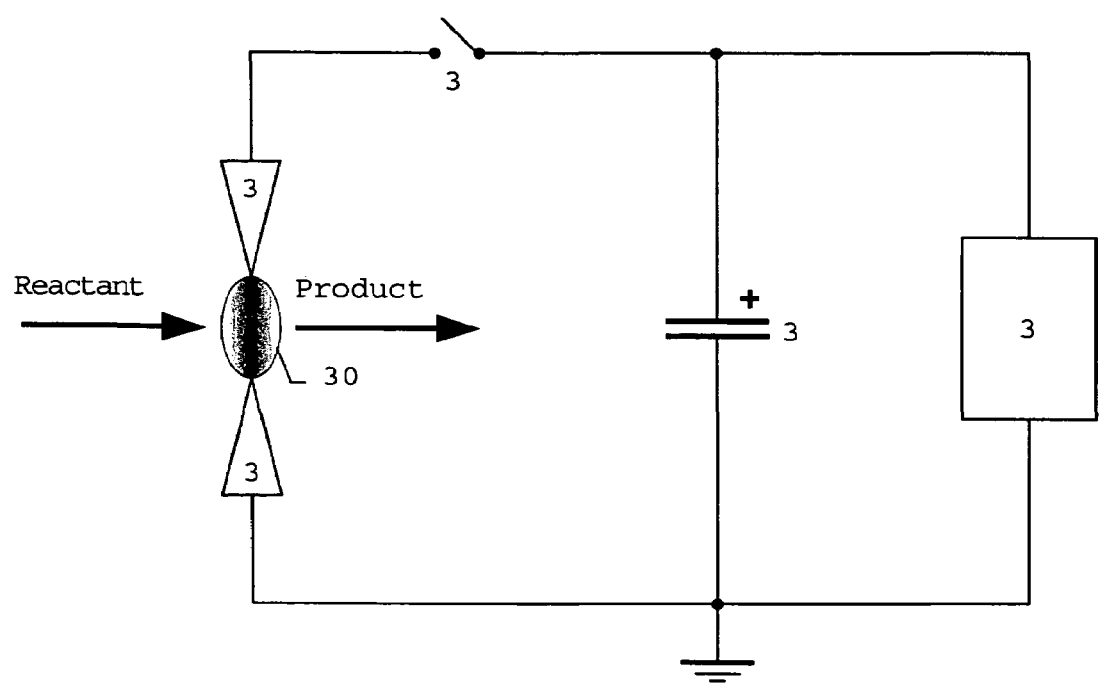
FIG. 1: A possible embodiment of a spark plasma reactor

FIG. 1 shows the principle of construction of a spark plasma reactor for the synthesis of NO (NO synthesis step). To produce spark discharges (30) between the two tips (33) and (34), the voltage produced at capacitor (31) is applied to the tips with the aid of a switch (32). The energy available for a discharge is restricted by the capacitor. The capacitor is charged up again after discharge by the voltage supply (35). Closing the switch (32) leads to an electrical flashover between the two tips (33) and (34) (puncturing the gas section), that is to say to the formation of pulse-shaped discharges, so-called spark discharges (30). The temporal and spatial development of the spark discharge depends on a number of parameters: pressure, type of gas, electrode geometry, electrode material, electrode spacing, external elements in the electrical circuit, etc.; and represents a very complicated dynamic process.

In the electrical sparks (30) gas temperatures of more than 10000 K are reached, which very efficiently facilitates the formation of NO in a discharge in air. It was found that about 10 to 20 eV per NO molecule of electric energy have to be expended for this. As explained above, in order to optimise the efficiency of NO formation, the nitrogen monoxide formed has to be cooled down as rapidly as possible, for example by contact with cold surfaces. Therefore, microreactors, with their very large surface areas as compared to the volume, are also extremely suitable for performing this process.

Spark discharges can be operated at pressures between 0.1 mbar and 10 bar. Electrical stimulation of the discharge is achieved by applying an alternating voltage to the electrodes. Depending on the pressure in the discharge chamber, the distance between the electrodes and the frequency and amplitude of the alternating voltage, discharges are produced on exceeding a sparking voltage. The hot plasma has a large cold surface area relative to its volume, which, inter alia, controls the quenching process in addition to the reactor walls (quenching rates of up to $10^8$ K/s [0.1 gigakelvin per second]). The discharge duration depends on the stimulation of and electrical elements in the discharge circuit and is between 1 microsecond and a few seconds, preferably in the region of a few milliseconds.

Whenever reference is made to an alternating voltage, this includes both pulsed direct voltages and voltages which change in any way with time.

As explained above, the desired discharge occurs by applying sufficient alternating voltage to the two electrodes. The voltage required depends on the free distance d (clearance) between the electrodes and also on the pressure in the discharge region, the gas composition and any inserts present between the tips in the discharge chamber. The distance d is preferably adjusted to between 0.01 and 10 mm. The voltages required can be 10 Vp to 100 kVp; preferably 100 Vp to 15 kVp and particularly preferably 500 Vp to 1.5 kVp in a microsystem. The frequency of the alternating voltage is between 10 Hz and 30 GHz, preferably between 50 Hz and 250 MHz.

The plasma reactor in FIG. 1 can be filled with a suitable catalyst in the form of pellets or granules in order to perform the process. The electric discharge takes place here in particular in the form of creeping spark discharges at the surface of the pellets. This means that still higher quenching rates can be achieved. Furthermore, the concentration of ions and radicals in the spatial vicinity of the surface of the catalyst is increased in this way.

Whenever reference is made to pellets in the following, this also includes particles, powdered materials or powders or other particulate states. The diameters can vary between 100 nanometres and 10 mm, preferably between 10 micrometres and 1 millimetre.

The catalyst pellets preferably consist of at least one finely divided support material chosen from the group aluminium oxide, titanium oxide, zirconium oxide, cerium oxide, silicon dioxide, magnesium oxide or mixed oxides of these and/or zeolites. The materials can also be extensively catalytically activated by the deposition on their surface of noble metals from the platinum group, in particular platinum, palladium, rhodium and iridium in highly dispersed form or with material types such as e.g. barium/yttrium/copper oxide, iron oxide and also by other types of doping (e.g. ion implantation). For this purpose, the specific surface area of the support materials should be at least 10 $m^2/g$ (measured in accordance with: DIN 66132). Due to the low thermal stress on electrodes in a spark discharge, materials with a low resistance to heat, such as for example those made of plastics or fibres, and also so-called microtubes, may also be used.

The electrodes in the plasma reactor may be constructed as flat structures which are arranged in parallel with each other or may form a coaxial arrangement with a middle electrode which is surrounded by a tubular electrode. To facilitate the formation of only very brief discharges, spatial inhomogeneities of any shape (flaked, grained as after attack by etching or holey surfaces, or mounds or saw-tooth shapes with sharp ridges, etc.), preferably peaks distributed over the surface, particularly preferably saw-tooth shapes distributed over the surface, may be provided which lead to local increases in the field and thus to the production of a discharge and inter alia also to the migrations from peak to peak.

The discharge can be stimulated by a number of different kinds of alternating voltages. For a change in the discharge characteristics temperature, degree of ionisation, etc. in the discharge chamber of the reactor, pulse-shaped stimulation voltages are particularly suitable. The duration of a pulse when operating with pulses is governed, inter alia by the gas system, the electrode material, the electrode shape and also by the clearance and are preferably between 10 ns and 1 ms. The voltage amplitudes can be 10 Vp to 100 kVp; preferably 100 Vp to 15 kVp, particularly preferably 500 Vp to 1.5 kVp in a microsystem. These pulsed direct voltages can also be operated from high repeat rates (of 10 MHz in the case of a 10 ns pulse (pulse duty factor 10:1)) down to low frequencies (10 to 0.01 Hz) and are modulated for example as "burst functions" in order to enable the reaction of adsorbed species.

The reactor in the NO synthesis step can be produced from any electrically and thermally suitable material. Plastics, ceramics and glasses (insulating or conductive) are mentioned in particular. Hybrid structures made of different materials are also possible, such as for example surfaces finished with doped diamond or depressions wet-packed with ferroelectric/dielectric material. These materials from the electrical engineering field (see DIN 40685) have inductive or capacitative properties and thus have an effect on the temporal and/or electrical discharge characteristics and thus on the properties or nature of the plasma produced, for example the temperature of a spark. In addition to this, other electrical characteristics such as the voltage amplitude and its change with time have an effect on the discharge characteristics and affect, for example, the working life of the electrodes or the efficiency of NO formation (discharge temperature).

As already explained, the wet-packing of suitable depressions with dielectric or ferroelectric material brings about the construction of an electrical switching element, namely of a capacitor or of a ferro-inductivity, which on the one hand decouples the preferred spark discharge or the temporary arc discharge from the source of current/power during discharge itself and restricts the temporal duration of this. Thermally hot discharges of short duration are therefore particularly preferred, in particular for NO synthesis, because they are required for the quenching process explained above, in addition to the small structures and thus small discharge volumes.

Figure 2:
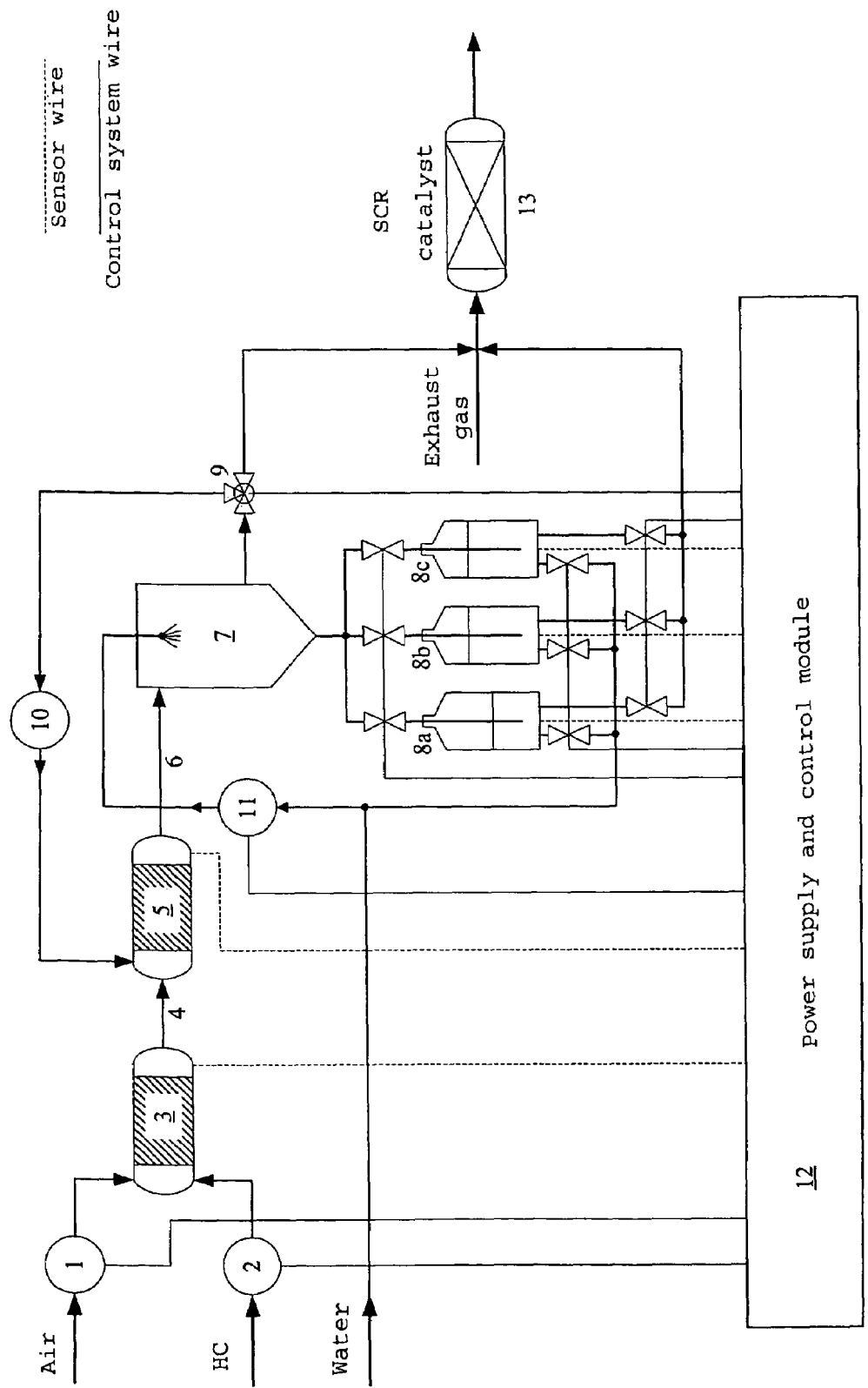
FIG. 2: Process chart

FIG. 2 shows a process chart for the proposed process. The exhaust gas from a combustion process, not shown here, or a heat machine, is passed over the SCR catalyst (13) to remove the nitrogen oxides present in the exhaust gas. The combustion process or heat machine is operated using a first, lean-mix, air/fuel mixture. The ammonia required for the SCR reaction is produced using the process chart shown in FIG. 2. For this purpose, a second, rich-mix, air/fuel mixture (4) is required, which contains nitrogen monoxide. This second air/fuel mixture is obtained, for example, by feeding air and hydrocarbons (HC) into a NO synthesis reactor using pumps (1) and (2) and burning these there, for example as a rich-mix, with the formation of NO. In a preferred embodiment, a thermal plasma burner or in another advantageous embodiment a spark discharge burner or cold combustion in a cold plasma is used to form NO in the NO synthesis reactor. Pump (2) can be a conventional fuel injection pump. A spark discharge burner also includes technologies by means of which thermally hot plasma, e.g. "electric arcs", can be produced briefly but repeatedly in a periodic manner.

The second, rich-mix air/fuel mixture (4) formed in this way, which consists substantially of NO, $H_2O$, $N_2$, CO, $CO_2$, $H_2O$ and $C_xH_y$, and also partly-oxidised hydrocarbons, is treated in the $NH_3$ synthesis reactor (catalysis reactor) (5) with the formation of ammonia. The catalyst is preferably electrically heated.

The ammonia present in the product gas stream (6) at the outlet from (5) is separated from the other constituents in the ammonia washer (7). Water is preferably used as the wash liquid and this simultaneously takes on the role of a storage medium for ammonia. The ammonia solution being formed is not used immediately for the SCR reaction, but is first temporarily stored. For this purpose, several storage containers (8a, 8b, 8c) are preferably used. To increase the ammonia concentration in the wash liquid, a pump (11) is provided which circulates the wash liquid until the desired $NH_3$ concentration is achieved. One of the containers at a time, for example (8a), is switched into this wash circuit, while the ammonia solution is withdrawn from another, for example (8c), and is injected into the exhaust gas stream to perform selective catalytic reduction. Addition of the ammonia solution is thus matched to the current concentration of nitrogen oxides in the exhaust gas in order to ensure optimum conversion of harmful substances with the smallest possible carry-over of ammonia.

The wash liquid is consumed due to use for exhaust gas treatment. The amount consumed is replaced by supplying fresh wash liquid from the wash circuit.

Connection of the storage containers to the various media streams, is performed via appropriate valve arrangements. A suitable valve arrangement is shown by way of example in FIG. 2.

Water is preferably used as the storage medium for ammonia. Ammonia has a high solubility in water and this is improved in a particularly advantageous manner by the simultaneous absorption of the carbon dioxide which is also present in the product gas stream. Ammonium carbonate, ammonium hydrogen carbonate and carbamates are formed by reaction of the two components with each other. Because the gas stream prior to entrance into the ammonia washer is hot, at between 60 and 800° C., preferably between 60 and 350° C., particularly preferably between 60 and 150° C., there may be, for example, an undesirable increase in the proportion of water vapour. A condenser is mounted downstream of the ammonia washer or a cooler is integrated into the absorber for this eventuality.

The entire process is monitored with the aid of sensors, the signals from which are evaluated in a control module (12) for controlling the various process steps. The energy supply for the arrangement is achieved by means of appropriate sources of current or power. Suitable sensors include all normally-used technologies such as e.g. temperature measurement with thermocouples, conductivity measurement, capacity measurement, $NH_3$ sensors, NO sensors, array sensors, surface wave sensors, optical sensors etc. in combination with dynamic or quasi-dynamic measurement and evaluation procedures.

It is possible that high concentrations of NO occur in product gas stream (6) and thus that losses of this valuable raw material for the production of ammonia may occur. Therefore, when high NO concentrations occur in the product gas stream, the gas stream is recycled again to the entrance to the NO or $NH_3$ synthesis reactor with the aid of pump (10) after leaving the ammonia washer (7). Otherwise, the gas stream is injected into the engine's exhaust gas stream via valve (9) controlled by (12). In another variant, not shown, the synthesis gas for example is mixed with air after the washer and the NO present therein is absorbed in a reversible store, e.g. BaO; the remainder of the gas stream is then injected into the engine's exhaust gas stream via valve (9) controlled by (12) and harmful substances are removed therefrom together with this exhaust gas stream. For short intervals of time, no air is added to the synthesis gas; desorption of the NO from the store then takes place and this is recycled to the entrance to the NO or $NH_3$ synthesis reactor together with the synthesis gas which now remains as a rich-mix. All the normal chemical methods are suitable for desorbing the NO, e.g. including thermal desorption due to the support being heated, etc. In another variant, not shown, the $NH_3$-containing synthesis gas (6) can be directly added to the exhaust gas stream when there is a particularly high demand for reducing agent.

If heavy deposits, e.g. of carbon, occur which can have a negative impact on the plasma electrical and/or catalytic properties of the apparatus, then these can easily be removed (regeration) (sic) in that for this purpose, exclusively air is passed through the arrangement during operation.

The control module (12) can, if required, include control and regulation of the SCR process in the exhaust gas or, as an alternative, may be connected to external control equipment for the SCR process.

The invention claimed is:

1. A process for the selective catalytic reduction of nitrogen oxides with ammonia in a lean-mix exhaust gas from a combustion process operated with a first, lean-mix air/fuel mixture, comprising providing the ammonia required for selective reduction from a second, rich-mix air/fuel mixture which contains nitrogen monoxide, made by a nitrogen monoxide synthesis step, by reduction of the nitrogen monoxide in a $NH_3$ synthesis step to give ammonia with formation of a product gas stream, wherein
the nitrogen monoxide-containing second air/fuel mixture is supplied to the $NH_3$ synthesis step for reduction of the nitrogen monoxide to ammonia over a three-way converter catalyst and the ammonia formed is separated from the product gas stream and is stored in a storage medium for use as and when required for selective catalytic reduction.

2. A process according to claim 1, wherein
the nitrogen monoxide present in the second air/fuel mixture is obtained from air in a NO synthesis step by means of a thermal plasma or an electrical arc discharge and the resulting gas mixture is enriched by the addition of fuel.

3. A process according to claim 1, wherein
to form the nitrogen monoxide present in the second air/fuel mixture, a rich-mix air/fuel mixture is treated in a NO synthesis step by means of an electrical gas discharge.

4. A process according to claim 1, wherein
the second air/fuel mixture in the NO synthesis step for the formation of nitrogen monoxide is subjected to thermal combustion which is optimised for the formation of nitrogen monoxide.

5. A process according to claim 1, wherein
the ammonia formed in the $NH_3$ synthesis step is separated from the product gas stream by means of an ammonia washer and is absorbed by the wash liquid which acts as the storage medium for ammonia.

6. A process according to claim 5, wherein
the product gas stream, after separation of the ammonia, is mixed with the exhaust gas stream from the combustion process.

7. A process according to claim 6, wherein
some of the product gas stream, after separation of the ammonia, is supplied to the entrance to the NO or $NH_3$ synthesis step.

8. A process according to claim 5, wherein
the three-way converter catalyst and the storage medium are arranged one after the other in a reactor in the $NH_3$ synthesis step.

9. A process according to claim 1, wherein
water is used as the storage medium for ammonia.

10. A process according to claim 9, wherein
the absorption of ammonia is improved by simultaneous absorption of carbon dioxide.

11. A process according to claim 1, wherein
the combustion process is the combustion of a superstoichiometrically composed air/fuel mixture in an internal combustion engine in a motor vehicle.

12. A process according to claim 1 wherein
the NO synthesis step, the $NH_3$ synthesis step and the ammonia washer are constructed in the form of microreactor systems.

13. A process according to claim 1, wherein
the three-way converter catalyst is electrically heated.

14. A process for the selective catalytic reduction of nitrogen oxides with ammonia in a lean-mix exhaust gas from a combustion process operated with a first, lean-mix air/fuel mixture, carrying out a NO synthesis step to obtain a nitrogen monoxide-containing second air/fuel mixture, supplying the nitrogen monoxide-containing second air/fuel mixture to a $NH_3$ synthesis step for reduction of the nitrogen monoxide to ammonia over a three-way converter catalyst to give ammonia with formation of a product gas stream, separating the ammonia formed thereby from the product gas stream and storing the ammonia in a storage medium for use as and when required for selective catalytic reduction.

15. The process according to claim 14, wherein the nitrogen monoxide present in the second air/fuel mixture is obtained from air in a NO synthesis step by means of a thermal plasma or an electrical gas discharge and the resulting gas mixture is enriched by the addition of fuel.

16. A process according to claim 14, wherein to form the nitrogen monoxide present in the second air/fuel mixture, a rich-mix air/fuel mixture is treated in a NO synthesis step by means of an electrical gas discharge.

17. The process according to claim 14, wherein water is used as the storage medium for ammonia.

18. A process according to claim 14, wherein the NO synthesis step, the $NH_3$ synthesis step and an ammonia separator in the form of a washer are in the form of a microreactor system.

* * * * *